Figure 1:
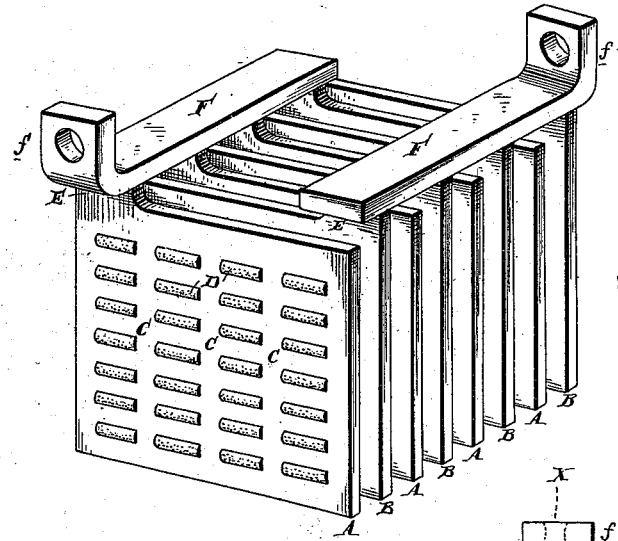

(No Model.)

R. M. HUNTER.
SECONDARY BATTERY.

No. 400,404. Patented Mar. 26, 1889.

WITNESSES:
Henry Drury
George F. Drury

INVENTOR:
R. M. Hunter

UNITED STATES PATENT OFFICE.

RUDOLPH M. HUNTER, OF PHILADELPHIA, PENNSYLVANIA.

SECONDARY BATTERY.

SPECIFICATION forming part of Letters Patent No. 400,404, dated March 26, 1889.

Application filed January 14, 1889. Serial No. 296,293. (No model.)

*To all whom it may concern:*

Be it known that I, RUDOLPH M. HUNTER, of the city and county of Philadelphia, and State of Pennsylvania, have invented an Improvement in Secondary Batteries or Accumulators, (Case 80,) of which the following is a specification.

My invention has reference to secondary batteries or accumulators; and it consists of certain improvements, all of which are fully set forth in the following specification and shown in the accompanying drawings, which form part thereof.

This application (Case 80) has special reference to the construction of the elements of which the complete battery is composed, and comprehends not only the element *per se*, but also the completed battery structure.

In carrying out my invention I form the supporting-plate for the active material of an alloy of lead, bismuth, and mercury. In practice I first form the active material in the proper shape, preferably hardened, and support it in a suitably-shaped mold. When this is done, I form an alloy of lead, antimony, and mercury, in suitable proportions, and cast the alloy around the active material, allowing it to cool and to shrink thereon. It is evident that so far as my present invention is concerned the elements may be made in any other suitable manner. For example, the supporting-plates may be made of the shape or construction desired—such, for instance, as is well known in the market—with holes, perforations, recesses, &c., and said holes, perforations, &c., may be subsequently filled with active material—such as oxide of lead or any suitable salt of lead. The particular shape or method of making the plate is immaterial to my invention. The alloy preferred is such, for instance, as is made by an admixture of ninety-eight per cent. of lead to one per cent. of bismuth and one per cent. of mercury. These metals are fused together, and when thoroughly mixed the alloy is cast into the form of the plate.

While I have given the above proportions, it is to be understood that I in no wise limit myself to them, as the quantities of the bismuth and mercury may be varied, as desired, provided sufficient bismuth is not used to make the plate too brittle to be practicable, and the proportion of the mercury is not such as would either make too soft an alloy, verging onto an amalgam, or be too small in quantity to form a suitable bond between the lead and bismuth. The lead is used as a support for the active material and must have sufficient conductivity to offer as little resistance to the passage of the electric current as is consistent with proper mechanical construction. It is desirable to make the plate light; but as this would make it too weak and liable to become bent out of shape and would also be difficult to cast I use instead of pure lead an alloy of lead and bismuth, the latter metal not only giving the requisite hardness but also enabling the thin plate to be readily cast, owing to the higher fluidity incident to the alloy. The hardening of the thin lead plate also provides hardened edges which overlap the active material and hold it in place; and hence in practice, where such plates are used in accumulators for electrically-propelled vehicles, these hardened edges prevent the escape of the active material. While the addition of the bismuth to the lead is a great advantage from a mechanical standpoint, yet from the electrical standpoint it is an objection, as it increases the electrical resistance of the plate—a feature which is anything but desirable in secondary batteries. Now, to overcome this objectionable feature, I add the mercury to the metal bath, and thus form what may be termed a "new" compound metal. The mercury amalgamates the lead and bismuth into a close bonded union and makes it more than a mixture, since it brings every particle of the two metals—lead and bismuth—in a close relationship as to conductivity, and at the same time by amalgamating with each of said metals it reduces the resistance of the plate as an entirety very greatly.

It is evident that in place of mixing the mercury with the lead and bismuth in the bath the plates first formed of these two metals may afterward be submerged in mercury for an instant and then allowed to stand, that the mercury may amalgamate the lead and bismuth together; or in place of so dipping the plate it may be confined in a muffle and there subjected to vaporized mercury.

In this latter case the entire set of positive or negative elements of a battery may be simultaneously treated.

Another part of my invention relates to the bridging piece or electrode which unites the various elements or plates of one polarity. This bridging-piece is usually burned onto the plates and is commonly formed of lead. In my present invention I form it of an alloy of lead, bismuth, and mercury, as in the case of the plates; or, instead of lead, in this instance, any other equivalent hardening element may be used. When these bridging-pieces are burned to the plates, the union of joints is formed more perfectly, and the conductivity of the joint is also greatly increased. The bridging-piece itself has its resistance reduced by being thus formed. These various expedients for reducing the internal resistance of the battery as an entirety increase the electro-motive force in the inverse ratio, and this is one of the most desirable directions of improvement in the storage-battery.

Figure 2:
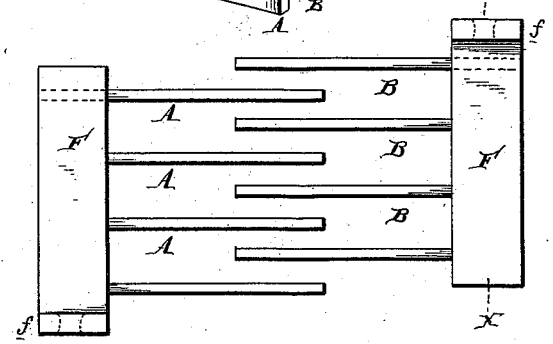
Figure 3:
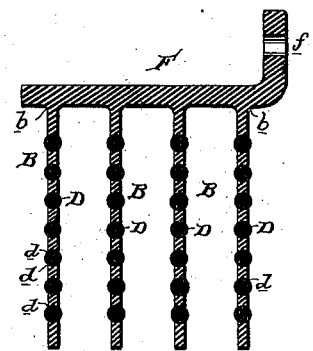

In the accompanying drawings, Figure 1 is a perspective view of a storage-battery without the vessel for holding the electrolytic fluid. Fig. 2 is a plan view of same, showing the positive and negative plates separated; and Fig. 3 is a cross-section of same on line $x$ $x$.

A and B are the two sets of plates of the opposite polarities, and are formed with the metal frames C, holding the active material D in any suitable manner. As shown, the active material is held in by lips $d$ of the plate. These plates have upwardly-extending necks E, to which the bridging-pieces F are burned or fused. These bridging-pieces F have their ends turned up, as at $f$, for connection with the conductors. Fig. 3 shows how the plates B or A are fused integral with the bridging-pieces F. The plates C and bridging-pieces F are formed of the alloy of lead, bismuth, and mercury, as hereinbefore specified, and by this construction the joints $b$ are of far lower conductivity than was heretofore the case. By the employment of this alloy in the bridging-pieces F, I am enabled to make them light, and thus reduce the weight of the battery.

Having thus described my invention, what I claim as new, and desire to secure by Letters Patent, is—

1. A secondary-battery element or plate for holding active material, formed of lead, bismuth, and mercury, intimately associated, substantially as set out.

2. A secondary battery having both its positive and negative plates formed of lead, bismuth, and mercury, intimately associated, substantially as set forth.

3. A secondary battery having the bridging piece or pieces connecting the plates of one polarity formed of lead and a hardening metal—such as bismuth and mercury—intimately associated, substantially as set forth.

4. A secondary battery having its plates and bridging-pieces formed of lead and a hardening metal like bismuth and mercury, intimately associated and connected by a burned or fused joint, substantially as set forth.

In testimony of which invention I hereunto set my hand.

RUDOLPH M. HUNTER.

Witnesses:
ERNEST HOWARD HUNTER,
E. M. BRECKINREED.

It is hereby certified that in Letters Patent No. 400,404, granted March 26, 1889, upon the application of Rudolph M. Hunter, of Philadelphia, Pennsylvania, for an improvement in "Secondary Batteries," errors appear in the printed specification requiring correction, as follows: In line 64, page 2, the word "and" should be stricken out and a comma inserted instead; in line 65, the dashes after the words "metal" and "mercury" should be stricken out and a comma inserted after the word "bismuth"; in line 68, the word "and" following the word "lead" should be stricken out and a comma inserted in its place, and in line 69 a comma should be inserted after the word "bismuth" and the comma after the word "mercury" should be stricken out; and that the Letters Patent should be read with these corrections therein that the same may conform to the record of the case in the Patent Office.

Signed, countersigned, and sealed this 2d day of April, A. D. 1889.

[SEAL.]

CYRUS BUSSEY,
*Assistant Secretary of the Interior.*

Countersigned:

C. E. MITCHELL,
*Commissioner of Patents.*